United States Patent [19]

Peterson et al.

[11] Patent Number: 5,181,159
[45] Date of Patent: Jan. 19, 1993

[54] AC TO DC CONVERTER HAVING AN ENHANCED POWER FACTOR

[75] Inventors: William A. Peterson, Vestal; Michael S. Elmore; Steven D. Sherwood, both of Endicott, all of N.Y.

[73] Assignee: General Electric Company, Johnson City, N.Y.

[21] Appl. No.: 855,111

[22] Filed: Mar. 11, 1992

Related U.S. Application Data

[63] Continuation of Ser. No. 632,867, Dec. 24, 1990.

[51] Int. Cl.[5] ............... H02M 7/217; G05F 1/70; G05F 1/613
[52] U.S. Cl. ............... 363/89; 363/46; 323/222
[58] Field of Search ............... 363/89, 24, 44–46; 323/222

[56] References Cited

U.S. PATENT DOCUMENTS

| | | | |
|---|---|---|---|
| 4,677,366 | 6/1987 | Wilkinson | 323/222 |
| 4,688,162 | 8/1987 | Mutch | 323/222 |
| 4,940,929 | 7/1990 | Williams | 323/222 |

FOREIGN PATENT DOCUMENTS

198873 1/1984 Japan ............... 323/222

OTHER PUBLICATIONS

J. E. Murray and D. C. Griffith, "The Live Driven Switches as a Block Box Load", PCI Oct. 1985 Proceedings.

Francisc C. Schwarz, "A Time-Domain Analysis of the Power Factor for a Rectifier Filter System with Over- and Subcritical Inductance", IEEE Transactions on Industrial Electronics and Control Instrumentation, May 1973.

I. Barbi and S. A. Oliveria da Silva, "Sinusoidal Live Current Rectification at Unity Power Factor with Boost Quasi Resonant Computers" 1990 IEEE.

Primary Examiner—Steven L. Stephan
Assistant Examiner—Adolf Berhane
Attorney, Agent, or Firm—Bernard E. Shay; Stephen A. Young

[57] ABSTRACT

The invention relates to an AC to DC converter having an improved power factor achieved by combining boost converter operation at the beginning and ending of each half wave of the AC input waveform, with passive operation at the middle portion of each half wave. The timing of the operation is based on comparing the instantaneous voltage with a stored average voltage, which has the effect of making boost converter operation go off at a fixed angle after the beginning of each half wave and go on at a fixed angle before the ending of each half wave, the angles being independent of the average AC voltage. The converter increases the power factor to a value between 90 and 97% and reduces the current waveform distortion to between 15 and 29%.

7 Claims, 2 Drawing Sheets

5,181,159

AC TO DC CONVERTER HAVING AN ENHANCED POWER FACTOR

BACKGROUND OF THE INVENTION

1. Field of the Invention

The invention relates to AC to DC converters, and more particularly to an AC to DC converter having an improved power factor.

2. Prior Art

The conversion of AC energy to DC energy is typically accomplished by either passive or active means.

In the passive approach the AC input voltage is rectified and inductors or capacitors are provided to filter the rectified voltage to a DC level with preferably minimum AC content. This approach is simple and uses a minimum of components. The disadvantage is that the input current drawn from the AC source is severely distorted and does not have the shape of an ideal sine wave. As a result there is a relatively low power factor and voltage distortion occurs in the AC source when source impedance is present.

The active approach also entails rectification of the AC voltage. An active converter is then used to draw input current in proportion to the rectified input voltage. The current into this converter is controlled with a feedback loop that uses the rectified voltage as a reference. The input current is very nearly a perfect sine wave in phase with the input voltage. This technique can produce a power factor of near unity and input current distortion under 3%. The drawback is that it requires a complicated control scheme, which utilizes either many discrete components or a specialized control integrated circuit. The response of the control loop needed for proper power factor operation, may also interfere with other loop requirements. The DC output voltage must also be greater than the peak of the input AC voltage, and in some applications it is desirable that the DC output voltage maintain a lesser value.

In many airborne applications of the invention, the electrical systems are supplied by a 400 Hz 115 VAC source. This voltage then requires conversion in an AC to DC converter to a DC voltage of 100-170 volts, which is within the range of operation of conventional semiconductor power devices. The final element in the power train is a DC to DC converter that produces a reduced voltage usually at set voltages between 5 and 28 volts at proportionally higher currents.

The present AC to DC converter has application to such a power train. In such an application, it is essential to electrical efficiency that the power exchange between the elements of the power train be efficient. The 115V 400 Hz AC source has a limited power capability and significant internal impedance. In the interest of electrical efficiency, it is important that loads, of which the AC to DC converter would be one, draw current with a near unity power factor and with minimal harmonic distortion.

The AC to DC converter of the present invention has immediate application to aircraft systems. In such systems, in addition to electrical performance requirements, the supplies should be of minimum weight and minimum bulk.

SUMMARY OF THE INVENTION

Accordingly it is an object of the present invention to provide an improved AC to DC converter.

It is another object to provide an AC to DC converter presenting an increased power factor to the AC supply.

It is still another object to provide an AC to DC converter producing a reduced harmonic distortion of the input current drawn from the AC supply.

It is a further object to provide an AC to DC converter providing a semi-regulated output voltage which is less than the peak value of the AC input voltage.

These and other objects of the invention are achieved in a novel AC to DC converter comprising a choke input filter including a bridge rectifier, a series connected inductor, and a shunt connected capacitor—to which has been added a power factor enhancement circuit.

The power factor enhancement circuit provides voltage boost converter operation at the beginning and at the ending of each half cycle of the AC input waveform. The power factor enhancement circuit comprises a semiconductor switch connected between a first node and the negative bridge terminal, a diode connected between that node and the positive terminal of the capacitor, and a circuit for controlling switch operation responsive to the instantaneous AC input voltage. The control circuit compares this input voltage to a DC reference proportional to a time average of the AC input voltage. The control circuit in comparing the two voltages, causes boost converter operation to occur at substantially fixed angles in the AC input voltage waveform, angles which are substantially independent of the average AC input voltage. The result is a very simple circuit providing an improved power factor, reduced current waveform distortion.

DESCRIPTION OF THE DRAWING

The inventive and distinctive features of the invention are set forth in the claims of the present application. The invention itself, however, together with further objects and advantages thereof may best be understood by reference to the following description and accompanying drawings, in which:

DESCRIPTION OF THE PREFERRED EMBODIMENT

Figure 1:
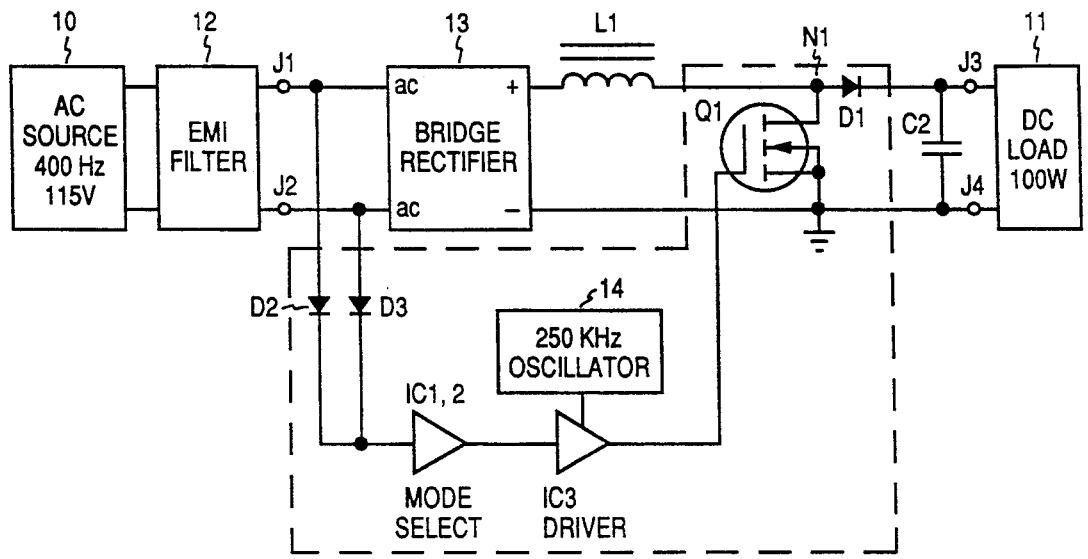
FIG. 1 is a simplified block diagram of a novel AC to DC converter connected between a 400 Hz AC source and a DC load and exhibiting an enhanced power factor and reduced harmonic distortion of the input current in withdrawing energy from the AC source.

FIG. 1 shows a novel AC to DC converter connected between an AC source 10 and a DC load 11. The converter draws energy from the AC source 10 with an improved power factor and reduced total harmonic distortion while delivering power to the load. It is also capable of delivering power at a lesser DC output voltage than the peak of the input AC voltage. The illustrated embodiment draws energy from a 400 HZ 115 volt AC source and supplies DC electrical power to a 100 watt DC load.

As shown in FIG. 1, the source 10 supplies AC electrical energy to the converter via an EMI filter 12. The converter operates as an active voltage boost converter at the beginning of each half cycle and at the end of each half cycle, and in between as a conventional "passive converter".

As will be explained, the transitions between modes are controlled—not in respect to a fixed voltage level in the rectified input voltage—but, by the difference between a voltage proportional to the average AC waveform and a voltage proportional to the instantaneous AC waveform. Thus, the transitions between modes correspond to two substantially fixed angles $\alpha 1$ and $\alpha 2$ measured along the rectified input voltage wave. Thus the proportion of the time that the converter is in the active mode remains independent of variations in the input voltage.

The output DC voltage and the input AC current of the AC to DC converter may be modified by proper selection of these switching angles. Since AC current is drawn from the source, both at the beginning and end of each period due to the boosting action, input current distortion is lower than with no boosting at all. Thus one might term the process as "side-lobe compensation" in that current during active operation is being added to each side of the central peak in the current waveform. In the process, some reduction occurs in the central peak. The dual of this time domain effect occurs in the frequency domain. Viewed in those terms, higher order harmonics are being removed from frequency terms to either side of the fundamental frequency of the AC input wave.

Returning now to a consideration of FIG. 1, the AC to DC converter consists of a bridge rectifier 13, an inductor L1, diode D1, capacitor C2, power transistor Q1 and a control circuit for converter mode selection. The control circuit determines the transition angle $\alpha 1$ and $\alpha 2$ between passive and active modes. It comprises a high frequency (250 KHz) oscillator 14 and an AC input voltage responsive and transistor gate driving circuit comprising diodes D2, D3, and three ICs (IC1, IC2, and IC3) as shown in the simplified illustration of FIG. 1. (More circuit detail is provided in FIG. 2.)

The AC source 10 is connected via an EMI filter 12 to the converter AC input terminals J1 and J2. These terminals are connected in turn to the AC input terminals of the bridge rectifier 13, whose positive output terminal is connected via inductor L1 to a first node N1, and whose negative output terminal is connected to the common circuit reference node and to the negative converter DC output terminal J4. The anode of diode D1 is connected to node N1, and the cathode is connected to the positive converter DC output terminal J3. The filter capacitor C2 is connected between the converter DC output terminals J3 and J4.

The bridge rectifier 13, inductor L1 and capacitor C2 constitute the elements of a conventional passive DC power supply having a choke input filter. The elements added to provide the active voltage boost converter operation include the diode D1, the MOSFET power transistor Q1, and the control circuit. The source electrode of the power transistor Q1 is connected to the common circuit reference node the drain electrode is connected to the node N1 and the gate is connected to the gate driver (IC3) of the control circuit.

The control circuit for the boost converter in FIG. 1 is simplified to illustrate the principle of operation. As earlier stated, the voltage boost converter is active part time. The first active interval starts at the initial cross-over and continues until a first angle $\alpha 1$ in the rectified AC waveform is reached. Then there is the interval of passive operation followed by the second interval of active operation which continues from a fixed angle $\alpha 2$ before the terminal cross-over to the terminal cross-over. During the interval of passive operation, a voltage maximum occurs, the boost converter is inactive, the power transistor Q1 is non-conductive, and the power supply operates as a traditional AC energized DC power supply with a choke input filter. The filter, which comprises the serial inductor L1, and the shunt capacitor C2, reduces the ripple from the rectifier output. Should the circuit be operated passively, and without periods assigned to active operation, the input current drawn by the converter from a sinusoidal voltage source exhibits the waveform illustrated in FIG. 3A.

Figure 3A:
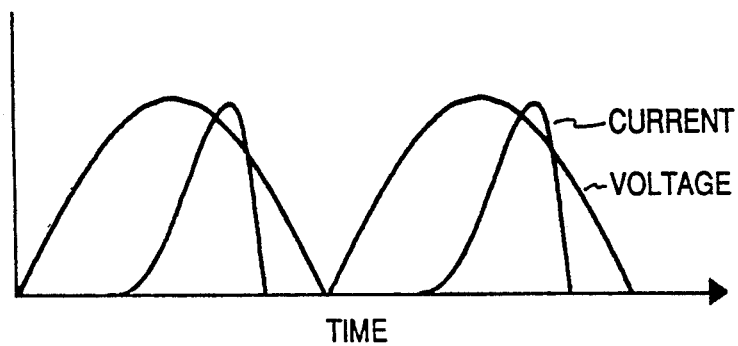
FIGS. 3A and 3B are waveforms illustrating the improved performance provided by the novel features of the converter in reducing harmonic distortion, and increasing the power factor.

The FIG. 3A waveforms represent two successive half-waves of the rectified voltage and current waveforms at 400 Hz frequency of the AC source. The voltage waveform is sinusoidal. The current waveform, also shown in rectified half waves, is distorted, being not only of shorter duration than the period of the voltage waveform, but also asymmetrical in reaching its maxima well after the voltage maxima. The picture shown in FIG. 3A will vary, depending upon the size of the filter elements (L1, C2) and upon the amount of current being drawn by the load.

A consideration of the FIG. 3A waveforms facilitates an explanation of undesirable load characteristics that they represent. The power derived from a source and supplied to a load is the integral of the product of the instantaneous voltage and current over one half wave of the voltage waveform. During the periods that no current is flowing, no power is derived, irrespective of the magnitude of the voltage. Assuming sinusoidal currents, a 90° lag of the current with respect to the voltage would result in the delivery of zero power to the load. The illustration in FIG. 3A corresponds to a power factor of approximately 60%. With the power factor pictured in FIG. 3A, the source might be rated to supply 100 VA, but the load would be able to draw only 60 watts.

In accordance with the invention, "side lobe" compensation provided by short instants of boost converter operation permits current to be drawn through a larger part of the duration of the voltage cycle, with the result that the power factor is greatly improved. The current drain, assuming operation of the power factor compensation circuit, may be altered to look like the waveform illustrated in FIG. 3B. In practice the power factor may be improved to 90% to 97% with the input current distortion reduced to between 15% and 29%.

Figure 2:
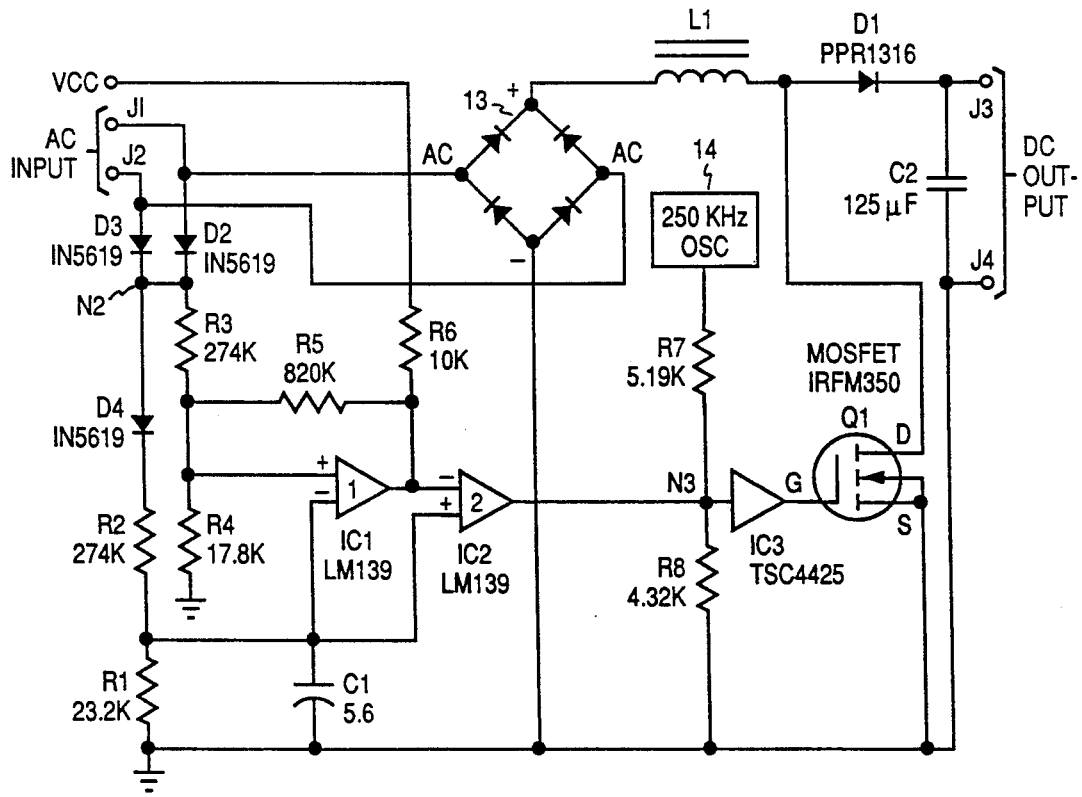
FIG. 2 is a more detailed circuit diagram of the AC to DC converter illustrated in FIG. 1.
Figure 3B:
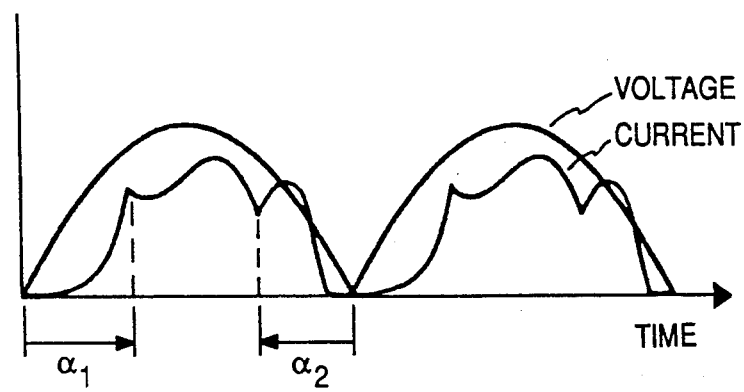

The waveforms in FIG. 3B illustrate the effect upon output current of the invention for two successive half cycles of the AC voltage waveform. Each half cycle has the three modes of operation earlier described. The initial side lobe compensation mode commences shortly subsequent to the zero crossing and continues through the first angle $\alpha 1$, during which the converter operates as a voltage boost converter. When the threshold setting $\alpha 1$ is exceeded, the voltage boost operation is discontinued, and operation (except for the initial conditions) is that of a conventional passively filtered DC supply. The second mode continues until the angle $(180-\alpha 2)$ is attained, which is set by a second threshold. In the third mode, the boost converter again operates. As the initial and final curves in each half cycle suggest, the angles $\alpha 1$ and $\alpha 2$ may be made to differ in order to accommodate the reactive parameters of the load. In the illustrated embodiment, the initial angle $\alpha 1$ is set larger than the terminal angle α2 and the thresholds in the circuit of FIG. 2 are designed to bring this about. The performance for the first half cycle is repeated for the second half cycle of the AC input voltage waveform.

The means for controlling the three modes of converter operation, as shown in the simplified diagram of FIG. 1, are the diodes D2, D3, the mode select logic, using the comparators, IC1 and IC2, the oscillator 14, and the gate driver (IC3) for the transistor Q1.

The diodes D2 and D3, which are connected between the converter input terminals J1 and J2 (ahead of the rectifier 13) and the input to the mode select logic, permit the mode select logic to respond in the same manner to the positive half waves as to the negative half waves of the AC input voltage waveform. As shown in FIG. 1, the anode of diode D2 is coupled to converter input terminal J1. Similarly the anode of diode D3 is connected to the converter terminal J2. The cathodes of both diodes are connected together and the paired cathodes are connected to the common input to the mode select logic. The mode select logic, which comprises IC1 and IC2 is thus able to respond to half-waves of one sense when the terminal J1 goes positive, and in a like manner to half-waves of the other sense when terminal J2 goes positive.

The mode select logic senses the magnitude of the instantaneous AC input potential, and compares it—by means not shown in FIG. 1—to a threshold proportional to the magnitude of the AC input potential. The threshold is thus not a fixed voltage, but in being referenced to the AC input voltage, becomes an angle independent of the input voltage. So long as the input voltage is less than the threshold, the mode select logic calls for operation of the gate driver, and the transistor switch Q1 switches at the 250 KHz frequency of the oscillator 14.

Assuming that the mode select logic dictates boost converter operation, the driver, IC3, which responds to both the output state of the mode select logic and to the oscillator 14, propagates a 250 KHz waveform to the gate of the transistor switch Q1. The control waveform is preferably a square wave, which turns the transistor switch on and off at the 250 KHz rate. The filtered product of the boost converter produces the side lobes of increased current drain illustrated in FIG. 3B.

The boost converter, as earlier suggested increases the current demand at the beginning and end of each half-wave. Assuming that the mode select block calls for boost converter operation, the transistor switch Q1, becomes alternately conductive and non-conductive. The result of the short period of conduction is to connect the inductor L1 across the DC terminals of the rectifier. The inductance of the inductor opposes an increase in current, storing electrical energy in the magnetic field and sustaining the voltage. When the transistor becomes non-conductive, the inductor tends to sustain the current. The voltage at node N1 swings rapidly from zero to the voltage stored on the storage capacitor C2, the diode D1 not becoming conductive until the voltage at node N1 exceeds that on the capacitor. When the voltage on the node N1 exceeds the voltage of the capacitor, the diode clamps the node to the capacitor voltage. The capacitor then draws current for the brief instants that it takes to discharge the inductor to the capacitor voltage and current is drawn each time the process is repeated at the 250 KHz repetition rate. In this manner the current demand is distributed more uniformly over each half cycle.

The values of the inductor L1 and capacitor C2 of the active circuit and the threshold settings may be adjusted to adjust the point in the cycle that conduction in this mode occurs, and the magnitude of the side lobes in relation to the main lobe of the current waveform. The current waveform illustrated in FIG. 3B represents a power factor of better than 90% with a waveform distortion of approximately 20%.

A more detailed diagram of the boost converter circuit is provided in FIG. 2. The comparators IC1 and IC2 have differential inputs as indicated by the polarity signs on the signal inputs. The voltage sample for the threshold circuit is coupled from the cathodes of diodes D2 and D3 by means of the voltage divider formed by resistors R3 and R4 to the positive terminal of the comparator IC1. The input wave proportional voltage threshold for the control circuit is provided by diode D4, resistors R1, R2 and capacitor C1. The cathodes of diodes D2 and D3 are connected together at node N2, which is connected via diode D4, via resistance R2, and via the shunt connected resistor R1/capacitor C1 pair to the common circuit reference node. This network charges capacitor C1, establishing a DC threshold proportional to the rectified AC input voltage. The input dependent threshold is coupled to the negative polarity input of comparator IC1 and to the positive polarity input of comparator IC2.

Assuming that the converter has been in operation, and that the rectified input waveform has a given voltage, the capacitor C1 has a stored charge and consequently maintains a DC voltage threshold proportional to the input waveform. At the start of the half wave, the instantaneous voltage coupled from the input terminals J1 or J2 to the positive input of the comparator IC1 is low relative to the voltage on capacitor C1, which is coupled to the negative input of the comparator IC1. As a result, the output of the comparator IC1 is low.

The comparator IC2 is connected to the output of comparator IC1 to provide inversion. The negative input of IC2 is coupled to the output of IC1, which is low at the beginning of the half wave of the rectified input waveform and, as earlier noted, the positive input of IC2 is coupled to the capacitor C1, which is charged and high (approximately 8 volts). Accordingly, with a larger voltage on its positive input than on its negative input, which is near zero, a high impedance output is produced by comparator IC2, which is coupled to the node N3, the input to the gate driver IC3.

Also, assuming that the converter has been in operation, the oscillator 14 is delivering an RF switching signal at 250 KHz via the voltage divider R7/R8 to the node N3. The driver IC3 couples the RF switching signal to the gate of the MOSFET Q1. Thus, boost converter operation is initiated.

As the instantaneous voltage increases on the positive input of comparator IC1, a point occurs at which it exceeds the input proportional voltage stored on the capacitor C1. The voltage on the positive input of the capacitor is reduced by the presence of the hysteresis network comprising R5 and R6 (typically 5 volts). The resistance R6 has one terminal connected to Vcc (+17V) and the other terminal connected to the output of the comparator IC1, and via resistance R5 to the positive input of IC1. With IC1 low, the resistance R5 reduces the instantaneous voltage that would otherwise be coupled from J1 and J2 to the positive input of IC1, and requires that the instantaneous voltage go higher to make up the difference imposed by hysteresis. Assuming no waveform distortion in the input voltage, this increases the angle α1 and delays the turn off of active operation at the beginning of the half wave.

As the threshold set at the negative input of IC1 is exceeded by the instantaneous voltage (reduced by hysteresis) at the positive input of comparator IC1, the output state goes to a high impedance pulled high via R6. The comparator IC2 goes low, connecting a low impedance between node N3 and ground. This biases the driver IC3 off and prevents the oscillator waveform from being coupled to the gate of transistor Q1 retaining it in an off condition. This ends the boost converter operation, and institutes passive operation of the converter. The instantaneous voltage at the positive input of the comparator IC1 remains higher than the negative input of the comparator IC1 throughout passive operation.

The last phase of operation occurs when the AC waveform coupled to the input of IC1 falls through the threshold at the angle α2. With IC1 output pulled high, the hysteresis reverses in sign and helps sustain the off condition past the value set by the charge stored on capacitor C1.

As so far described, the comparator IC1 determines the switching angles α1 and α2. The time constant of the circuit R1 C1, which establishes the input voltage proportional reference is approximately a factor of ten times the period of the AC input voltage. Thus the reference voltage may be treated as constant over a period, while being proportional to the time average of AC input voltage. Since the instantaneous voltage developed in the voltage divider R3/R4 is proportional to the instantaneous input voltage, the comparison performed by the comparator becomes primarily a function of the angle α1 or α2) from the zero crossing and to a first order independent of the time average of the AC input voltage. A secondary effect of the hysteresis network (i.e. R5 and R6) is that the boost is forced into the off state when the AC source is not present. Resistor R6 is a pull up for the comparator IC1 in addition to providing part of the hysteresis.

In the embodiment herein disclosed, power factors of 90% to 97% with 15% to 29% input current distortion may be achieved. This performance may be achieved when the steady state input voltage varies from 96 volts to 134 volts (RMS) and there is a 4 to 1 variation in load. The boosted output voltage will vary under these circumstances between 110 Volts and 175 Volts DC. This performance represents an improvement in power factor and a reduction in current distortion over the standard values specified for airborne equipment of more than 75% and less than 30%, respectively. The indicated range in output voltage is acceptable for use as the input stage to a DC to DC converter.

The illustrated embodiment is a very economical design. It requires very few additional parts over that of a passive AC to DC converter, since the inductor and capacitor are already present. The oscillator usually need not be a separate element, but in many aircraft systems may be derived from another component of the power system. Thus, beyond diodes, resistors, and capacitors, the principal additional parts are the three ICs and the power transistor.

The efficiency in utilization of the additional parts required for active operation is high because boosting only occurs when the AC input voltage is low. Thus processing of the full power is not required by the additional parts. In requiring no additional feedback loops of its own, the converter does not compromise the regulatory feedback loop response in the overall system.

Finally, the hold up time at the storage capacitor (C2) is improved, since the DC output voltage is greater than for the passive approach.

Depending upon application, the duration of the boost periods in the converter need not be unequal, as illustrated, and thus need not involve hysteresis. In other applications, hysteresis may be required of a different magnitude or sense, from that shown. These choices depend upon the nature of the load and other system requirements. Adjustment of the magnitude of the hysteresis is set by the values of resistances R5 and R6.

The novel circuit presented here offers some of the best features of both passive and active approaches. Power factor improvement over the passive approach is obtained, along with reduced harmonic distortion of the input current. The DC output voltage is also less than the peak of the AC input voltage which provides desirable flexibility when using power semiconductors having limited voltage ratings. Meanwhile during the critical period of each half wave, the simplicity of the passive approach is realized.

What is claimed is:

1. An AC to DC converter having an enhanced power factor comprising
   A) a first and a second converter input terminal for connection to a source of AC electrical energy at a first frequency;
   B) a positive and a negative converter DC output terminal for connection to a load;
   C) a full wave rectifier coupled to said first and said second converter input terminals for converting AC electrical energy to DC, said rectifier having positive and negative output terminals, said negative rectifier output terminal being connected to said negative converter output terminal;
   D) an inductor connected between said positive rectifier output terminal and a first node;
   E) a solid state switch having a control electrode, and two principal electrodes one of which is connected to said negative converter output terminal and the other of which is connected to said first node;
   F) a diode having its anode connected to said first node and its cathode to said positive converter output terminal;
   G) an energy storage capacitor connected between said positive and negative converter output terminals;
   said converter under load, when said transistor is quiescent, drawing energy primarily from said AC source during the middle portion, about the peak of each half cycle of the instantaneous AC voltage waveform of said source of AC electrical energy,
   H) voltage sensing means coupled between said input terminals for sensing when the magnitude of the voltage of the instantaneous AC voltage waveform of said source of AC electrical energy is less than a threshold value above zero on the rising and falling portion of each half cycle, and
   I) means responsive to said voltage sensing means coupled to said gate electrode for operating said solid state switch at a high frequency rate in relation to said first frequency during the beginning and ending of each half cycle of the instantaneous AC waveform that are below said threshold;

said inductor, solid state switch, diode and capacitor forming a boost converter, operating at said high frequency rate at the beginning and ending of each half cycle to increase the instantaneous energy drawn from said AC source in order to increase the withdrawal of energy throughout each cycle and enhance the power factor.

2. The AC to DC converter set forth in claim 1 wherein said threshold is made proportional to a time average of said AC input potential to cause boost converter turn off at an angle ($\alpha 1$) after the first zero crossing of a half cycle, and boost converter turn on at an angle ($\alpha 2$) before the second zero crossing of the half cycle, which angles are substantially independent of variations in said time average of said AC input potential.

3. The AC to DC converter set forth in claim 2 wherein the angle ($\alpha 1$) measured after said first zero crossing of a half cycle to boost converter turn off differs from the angle ($\alpha 2$) measured from boost converter turn on to the second zero crossing of the half cycle.

4. The AC to DC converter set forth in claim 2 wherein the turn off angle ($\alpha 1$) measured after said first zero crossing of a half cycle to boost converter turn off is greater than the angle ($\alpha 2$) measured from boost converter turn on to the second zero crossing of the half cycle.

5. The AC to DC converter set forth in claim 2 wherein said solid state switch is a MOSFET transistor, with the source connected to the negative converter output terminal and the drain connected to said first node.

6. The AC to DC converter set forth in claim 3 wherein said high frequency switching rate is at least two orders of magnitude greater than the frequency of said AC source.

7. The AC to DC converter set forth in claim 6 wherein said full wave rectifier is a bridge rectifier.

* * * * *